Dec. 25, 1928.
I. PATRICK
1,696,323
COMPOSITE BLADE FOR SCISSORS
Filed April 16, 1925
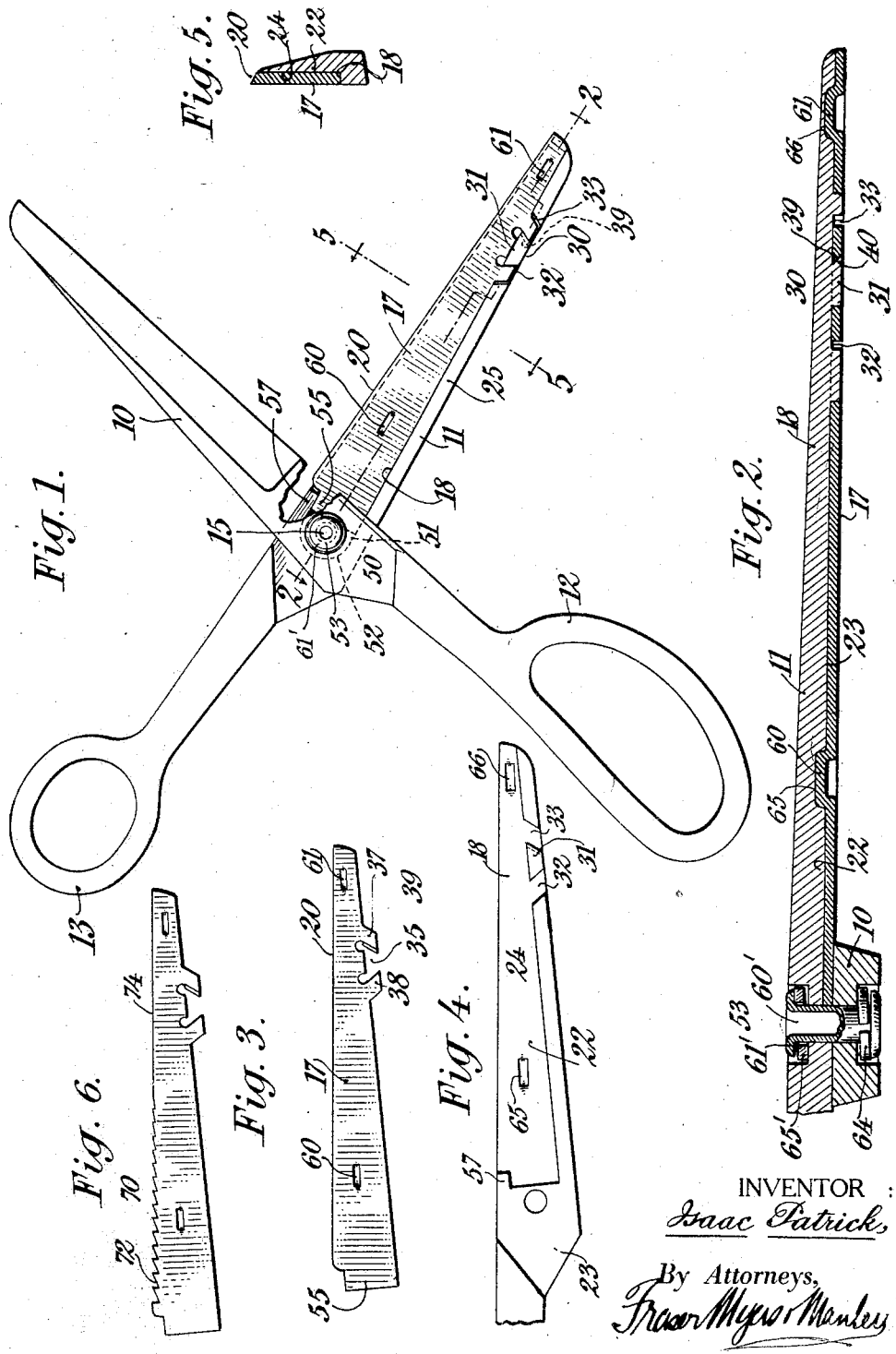
INVENTOR:
Isaac Patrick,
By Attorneys,
Fraser Myers Manley Patented Dec. 25, 1928.

1,696,323

UNITED STATES PATENT OFFICE.

ISAAC PATRICK, OF JAMAICA, NEW YORK.

COMPOSITE BLADE FOR SCISSORS.

Application filed April 16, 1925. Serial No. 23,505.

This invention relates to composite blades for scissors, shears, and the like, one part of which is a detachable cutter and is replaceable by another when the edge thereon becomes dull, and also to a cutter, and aims to provide improvements therein.

The invention provides composite blades for scissors or shears of an improved construction whereby a secure connection between the parts of said blade is obtained. The improved construction is simple and well suited for large scale manufacture.

The invention provides a cutter or cutting part which, with the parts of the connecting means formed thereon, is readily made from a flat strip of metal.

An embodiment of the invention is illustrated in the accompanying drawings, wherein Figure 1 is a side view of the scissors or shears, opened as in cutting, provided with the improved composite blade.

Fig. 2 is an enlarged sectional view on the line 2—2 of Fig. 1.

Fig. 3 is a detailed view of one of the cutting parts.

Fig. 4 is a view of that part of one of the composite blades which supports the cutting part, with the cutter removed.

Fig. 5 is a cross-section through a blade on the line 5—5, Fig. 1.

Fig. 6 shows a cutter having a serrated edge.

Referring to said drawings, numerals 10, 11 indicate a pair of blades having handles 12, 13 forming a scissors, the blades in the illustrated embodiment being pivoted, as indicated at 15, the blades being opened and closed by the opening and closing of the handles 12, 13 in the usual and well-understood manner. One or both of the blades 10, 11 is a composite blade. The blade 11 is here shown as a composite blade. The composite blade comprises a cutter or cutting portion 17 and a supporting portion 18.

The cutter 17 is in the form of a thin, flat strip of metal having a sharpened edge 20 thereon constituting the cutting edge. The supporting portion 18 is preferably provided with a shallow recess 22 on the inner face 23 (Fig. 2), in which recess the cutter 17 is adapted to be fit or lie and be fastened, as described in my application Serial No. 742,829, filed October 10, 1924. The said supporting portion 18 at the lower part of the recess 22, opposite the cutting edge 20 (when said cutter is in said recess), is preferably provided with a shoulder 25 adapted to firmly support said cutter 17 under the pressure exerted on the cutting edge 20 in the act of cutting.

Means are provided for fastening the cutter 17 and the supporting portion 18 together. These means are of such a character that the cutter 17 is entirely or substantially flat, and is very well suited to manufacture, packaging and use.

Means are preferably provided at or near the two ends of the cutter for fastening it to the supporting part 18. The means 30 at the outer end of the cutter conveniently comprise a lug 31 projecting from the inner side of the supporting part, of a height corresponding to the thickness of the cutter 17, and conveniently formed by cutting away the shoulder 25 at each side of the said lug, as indicated at 32, 33. The cutter 17 is provided with a corresponding recess 35.

The lug or projection 31 and the recess 35 are conveniently in the form of a dovetail. Moreover, the parts 37, 38 at each side of the recess 35 are preferably made somewhat resilient, so as to snap over or closely engage the lug or projection 31. The edge 39 of one or both of the parts 37, 38 facing the recess 35 is preferably inclined with relation to a perpendicular drawn from the flat face of the cutter 17, and the lug 30 is also preferably formed with a corresponding face, as indicated at 40 (Fig. 2).

The fastening means 50 at the inner end of the cutter 17 is conveniently a prolongation 51 of the flat recess 22 to, or near, the pivot 53 of the scissors.

The cutter 17 is conveniently provided with a tongue 55 projecting longitudinally thereof in the planes of the faces of the flat sides, adapted to fit in the prolonged portion 51 of the recess 52. The supporting portion 18 is provided with means for holding the inner end of the cutter 17 against the supporting shoulder 18, and this means is conveniently a shoulder 57 opposite the shoulder 25, the shoulders 51 and 25 being spaced the width of the tongue 55 of the cutter 17. The part 51 of the recess is at a part of the scissors which is normally covered, or partly covered, by the opposite blade during the normal use of the scissors in cutting, and the opposite blade serves to hold the cutter 17 against the broad face 24 of the recess 22.

The two blades 10, 11 are preferably resiliently drawn together at the pivotal connection. To this end, the pivotal connection is conveniently in the form of a hollow sleeve 60' having its ends 61' turned over and confining between these turned over ends, and the blades, one or more spring washers, 64, 65', as described in my aforesaid application.

The cutters 17 may be formed of flat sheet metal, and may be given a very hard temper, which enables a cutting edge to be provided which is more durable than with the ordinary one piece blades. Moreover, with the type of scissors herein described, the adjustment of the cutting blades does not get out of order. The two cutting edges, even when one cutter 17 is substituted for another, always maintain their proper cutting relation or "tension".

When a cutter becomes dull it may be replaced by another, the parts of the connection 30 being forced apart, and the inner end 55 of the cutter slid outwardly out of the portion 51 of the recess 22. The new cutter is replaced by placing the extension 55 in the prolongation 51 of the recess, and snapping the recess portion 35 of the cutter 17 over the lug 31.

The supporting portion or portions 18 of the blade or blades may be formed of an aluminum or other alloy such as now known possessing a hardness and strength similar to steel, by die shaping or casting. By this method, close uniformity in size and shape of the supporting portions 18 of the blades may be obtained, which would thus render the substitution or renewal of cutters 17 being made without difficulty. A uniform fit between the supporting part 18 and cutter 17 used to replace other cutters, is thus obtained.

When necessary or desirable, the cutter 17 may be provided with one or more ribs 60, 61 projecting from its back face and adapted to snugly fit into corresponding recesses or slots 65, 66 formed in the supporting part 18 of the blade, these slots being preferably formed with parallel walls. The formation of slots with parallel walls is conducive to manufacture with great accuracy and thereby a close fit being obtained between the rib and slot. These ribs 60, 61, by engaging the sides of the recesses, act to resist canting or twisting of the cutters in the recess 22 and thereby assist in holding the cutter against the broad face 24 of the recess 22 against strains tending to separate said cutters from the broad face of said recess. The ribs 60, 61, instead of being formed in the cutter may be formed in the supporting part 18 and the recesses 65, 66 be in the cutters.

In Fig. 6 there is illustrated a cutter having a serrated edge 70, which is especially useful in cutting thick mobile materials, such as locks of hair. Here the pressure of the edges on the part of the material or lock being immediately severed, particularly when the scissors are opened wide, tends to press the material or lock away from the cutting edge. By serrating the edges of the cutters, the lock as a whole, or the material in front of the part immediately acted on by the cutters, is held by the blades and prevented from springing away from the cutters, and a regular cut made.

These serrations are preferably made with relatively long downwardly inclined sides 72 toward or facing the pivoted end of the blades, so that similar inclined sides 72 on opposite blades, are more nearly parallel than the axes of the blades, and therefore are able to cut with lessened tendency to push away the material ahead of the part of the material being immediately cut. At that part of the cutter where the blades cut with their axis nearly parallel, the serrations may be omitted, as indicated at 74, Fig. 6. The depth and spacing of the serrations conveniently diminish toward the non-serrated part 74 of the cutter, as shown.

The invention may receive other embodiments than that herein specifically illustrated and described, and may be applied to other types of scissors or shears than that illustrated.

What I claim is:

1. A composite blade comprising a cutter and a supporting part, and means for fastening said parts together, said cutter being a flat plate, and said fastening means comprising parts on said cutter lying in the planes of the faces of said plate, said fastening means comprising a dovetail joint in the plane of said cutter and supporting part, a part of said dovetail joint having an incline with reference to a perpendicular to the face of said cutter, whereby said cutter is held against displacement in the direction of said perpendicular.

2. A composite blade comprising a cutter and a supporting part, and means for fastening said parts together, said cutter being a flat plate having a pair of resilient tongues at the rear edge thereof lying wholly in the planes of the faces of said plate, and said supporting part having in its face near the rear edge thereof a pair of grooves flanking a rib, said tongues being adapted to be snapped over said rib into said grooves.

3. A composite blade comprising a cutter and a supporting part, and means for fastening said parts together, said cutter being a flat plate, said fastening means comprising parts on said cutter lying in the planes of the faces of said plate, and said supporting part having a longitudinal recess in its inner face into which said cutter is adapted to fit, said recess having a shoulder at its lower side for supporting said cutter opposite its cutting edge, said recess extending to near the pivotal point of the scissors, at a part of the blade which is partly covered by the opposite blade during the normal use of the blades in cutting, said supporting part having a pair of grooves in its shoulder inclined with relation to each other and of the same depth as the recess, and said cutter having a pair of tongues extending into said grooves.

4. A composite blade comprising a cutter and a supporting part, and means for fastening said parts together, said cutter being a flat plate, said fastening means comprising parts on said cutter lying in the planes of the faces of said plate, and said supporting part having a longitudinal recess in its inner face into which said cutter is adapted to fit, said recess having a shoulder at its lower side for supporting said cutter opposite its cutting edge, said fastening means comprising a dovetail joint in the plane of said cutter between said cutter and supporting part.

5. Scissors or shears having a composite blade, comprising a cutter and a supporting part, means for fastening said parts together comprising a tongue and groove connection at one edge of the blade, and means for resisting canting of said cutter, comprising a slot in one of said parts running longitudinally thereof, and a rib on the other adapted to fit closely into said slot, said slot and rib being disposed intermediate the longitudinal edges of the blade.

In witness whereof, I have hereunto signed my name.

ISAAC PATRICK.